June 18, 1940. W. A. NIVLING 2,204,615
PROCESS OF MAKING SOLUBLE STARCH
Filed Aug. 26, 1937
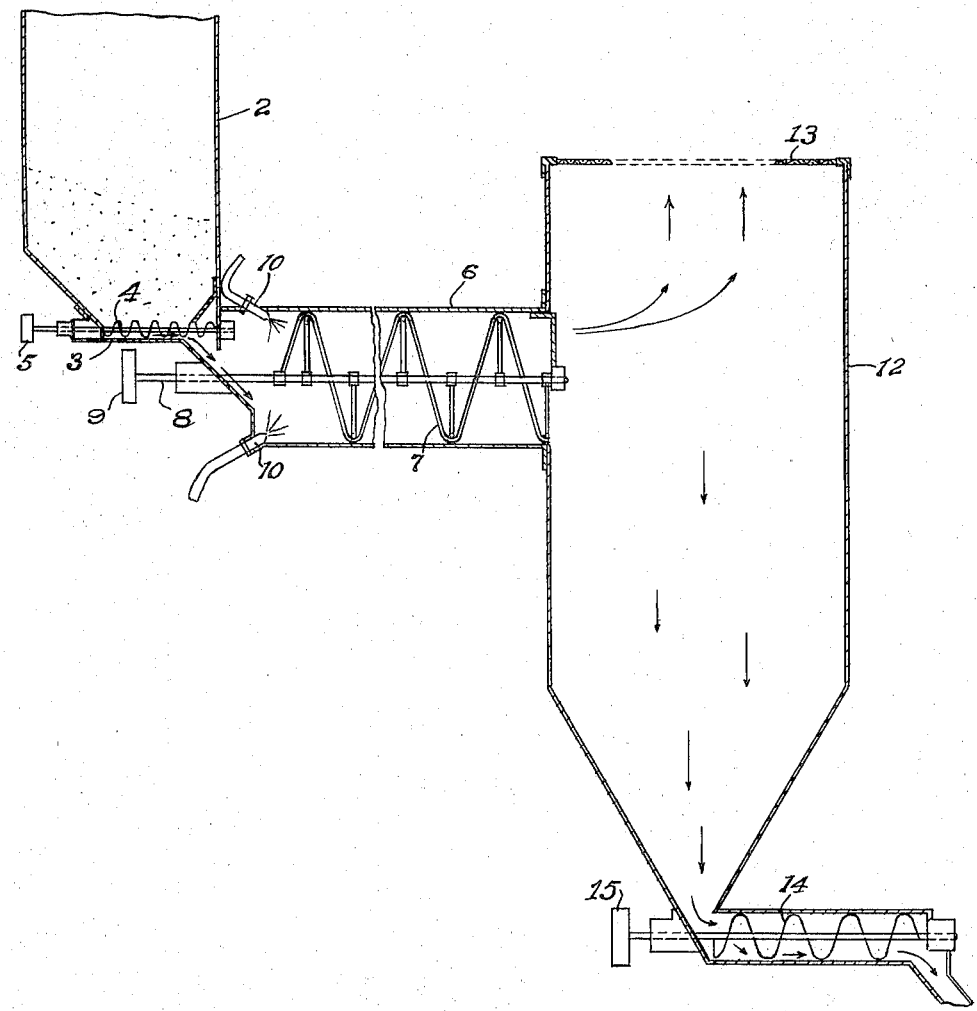
INVENTOR
Walter A. Nivling,
BY
ATTORNEY.

Patented June 18, 1940

2,204,615

UNITED STATES PATENT OFFICE 2,204,615

PROCESS OF MAKING SOLUBLE STARCH

Walter A. Nivling, Newton, Mass.

Application August 26, 1937, Serial No. 161,052

2 Claims. (Cl. 127—33)

This invention relates to a new, more economical and highly effective method for converting or modifying the natural paste-forming character of starch.

The preparation of starch for various industrial uses involves the mechanical or physical separation from adventitious matter such as fiber, bran, oils, glutens and other non-starchy matter with which it is initially associated. For many purposes it is necessary to modify the character of the starch so that when heated to 140 degrees F. or above with from one to three parts of water, it will not be pasty but will dissolve to form a free-flowing liquid. To effect such a change requires a chemical alteration of the substance of the starch itself.

While many processes of modifying starches so as to make their solutions more free-flowing have been widely known and used heretofore, the present invention provides a new, more economical and highly effective method of producing a soluble starch by oxidation which will form a free-flowing colloidal solution, homogeneous in character.

My process should be sharply distinguished from prior processes in which starch is treated with acids or acid salts by heating. These prior processes produce thin boiling starches, dextrines or sugars according to the time and severity of the treatment, whereas the end product of my method is distinctly different in that it contains neither dextrines nor sugars, or at most only a negligible trace of dextrine. My conversion is effected without employing either acids or heat and the end products of my method are of an entirely different type and are known as oxidized starches. My end product is distinctive also by virtue of its very high protective colloid properties.

In carrying out my present invention I reduce the starchy material to be treated to a powdery state and then suspend the starch in a finely divided condition in an atmosphere charged with oxidizing chemicals. In other words, the converting chemical and the starch are brought together while both are minutely subdivided and while both are suspended in a gaseous medium. In this condition, agitation of the medium brings the constituents into intimate and uniform contact with each other with a resulting reaction of the chemical on the starch particles with first and preferential attack on the more resistant outer cell wall of the starch granule. A convenient method of effecting this result is to dissolve the chemical or chemicals and then to atomize the chemical or chemicals into an atmosphere in which the starch is suspended as a starch dust. This may be done in various ways as, for example, by atomizing both the starch and the converting chemical or chemicals and bringing together the two currents of air utilized in performing the atomizing operation. Thus the constituents become intimately and uniformly intermixed, the reaction proceeds and the mixture is carried forward into a collecting or settling chamber from which the air or other gaseous suspending medium escapes. The treated starch is there collected and is conveyed to any convenient form of dryer to remove excess moisture and is then packed for market. Or, the treated starch may be discharged from the treating chamber into washing or other purifying apparatus, or into equipment designed to subject the starch to any other additional treatment which may be desired.

The oxidizing chemicals used in this process may be the same as those used in prior art methods. Common examples are the various hypochlorites, perborates, peroxides, permanganates or other oxidizing chemicals which are readily soluble in water so that they lend themselves conveniently to use in this method. My process has the advantage of reducing to a minimum the quantity of water added to the starch and which must later be evaporated in the drying operation, while at the same time effecting such an intermingling of the constituents that the chemical or chemicals are distributed with practically perfect uniformity throughout the entire quantity of the starch. Each particle of starch thus receives substantially the same amount of chemical as any other particle.

The single figure of the accompanying drawing is a diagrammatic view of an apparatus which may be conveniently used in practicing my method above described. As there shown, a supply of powdered starch is placed in a hopper 2 provided with bottom walls which taper both laterally and longitudinally so as to guide the starch into a trough 3 in which a screw conveyor is mounted. This conveyor is mounted on a shaft supported in suitable bearings and is equipped with a pulley 5, by means of which it may be driven from any convenient source of power. Preferably, the drive is of the variable speed variety such, for example, as a Reeves Drive, so that the screw can be driven positively at any desired speed and that speed can be accurately controlled. Thus the rate of discharge of the starch can be accurately regulated. From the hopper 2 through the trough 3 and conveyor 4 by means of pulley 5, the material to be treated is delivered at desired rate into conveyor 6 provided with agitating mechanism 7 mounted on shaft 8 and operated by pulley 9. This mechanism may be driven from any convenient source of power at such a speed as will lift and keep the starch suspended and aid in the intermingling of the starch and chemical. The agitating blade 7 may be continuous or discontinuous and be so pitched as to hasten or retard the delivery of the starch into the collecting chamber 12 provided with perforated cover 13 and also provided with sloping bottom to deliver the treated starch to conveyor 14. Conveyor 14 may be mounted on a suitably supported shaft and driven by pulley 15 actuated from any convenient source of power so as to deliver the treated starch into a suitable dryer or other storage or treating vessel. The treating chemical is prepared in any convenient vessel (not shown) and is introduced in measured amounts through conducting pipes and atomizing nozzles 10. By means of adjustably controlled drives and measured delivery of chemicals atomized by air or other suitable gases, the converting chemicals and starch can be proportioned so that the process may be either a continuous process or a batch process.

Usually the nature of the equipment will be such that the length of time occupied by the travel of a given quantity of starch through the mixing chamber 6, settling chamber 12 and conveyor 14 will be sufficient for the practical completion of the chemical reaction under the preferred conditions. That is, while the reaction can be made to proceed very rapidly, a better product is obtained with a slower rate of reaction, and an important feature of this invention resides in a novel control of the reaction rate. I have found that when a converting chemical such, for example, as sodium hypochlorite in solution is mixed with powdered starch, the reaction apparently proceeds at a very rapid and uneven rate on the different parts of the starch granule. The chemical appears to penetrate the starch granule rapidly and it reacts more quickly on the inner portion of the starch granule than on the outer enveloping portion. At any rate, it seems clear that the oxidizing chemical exerts its action unevenly and so rapidly on parts of the starch granule that unless inhibited, the chemical itself is in part decomposed in such a way as to not only result in losses but also to produce an unfavorable effect on other portions of the granule.

I have found, however, that this difficulty can be overcome, and the reaction controlled and made to proceed in a more orderly fashion by associating a suitable retarding agent with the oxidizing chemical. Various substances may be used as inhibiting or retarding agents; for example, basic substances such as caustic soda or soda ash, caustic potash or potassium carbonate. It appears that most basic substances have this retarding action. Obviously, however, the retarding substance must be stable in the presence of the acting oxidizing agent used. This, therefore, precludes the use of ammonia compounds which are broken down by active oxidizing agents such as sodium hypochlorite. I have also found that those basic substances which form colloidal solutions such, for example, as sodium stearate, sodium resinate, sodium silicate are more effective as retardants than the basic substances such as soda ash, caustic soda or caustic potash which form true or molecular solutions. It may be that substances which form colloidal solutions, whether basic or not, may act by virtue of their colloidal character which would inhibit or retard the penetration of the active oxidizing chemical but whatever the explanation, I have found colloidal basic substances like sodium silicates may at times be preferable, the materials being selected with due regard to the nature of the reacting chemical and to each other. In general, it may be stated that the proportion of basic substance or colloidal material added to the converting chemical will be in the order of about one to five per cent of the chemical solution used for converting. For example, a suitable conversion of starch may be effected by atomizing four per cent of oxygen obtained from a solution of sodium hypochlorite, calculated to the dry weight of the starch, but if with every one hundred pounds of sodium hypochlorite solution, there is dissolved two pounds, more or less, of caustic soda, the conversion reaction will proceed more slowly and more orderly and more economically than if the caustic soda had been omitted, and further, if sodium silicate is substituted for all or part of the caustic soda, the reaction proceeds still more slowly. The operator, therefore, is enabled to adjust the rate of reaction and amount of conversion to obtain the desired end product uniformly. This same control of rate of oxidation can be utilized in prior art processes such as those in which the oxidizing chemical or chemicals are added to the starch suspended in liquid.

It will be observed that the foregoing process converts the starch into a soluble form at a single operation with a single handling of the material and with the addition of a minimum quantity of water, later to be removed in the drying operation. Thus the process is performed far more economically than in the usual prior art methods. In addition, I have found that it effects approximately a forty per cent saving in chemicals. It also effects a very substantial material saving in time and equipment required. It is useful not only in treating starches but useful also in the conversion of the constituents of flours and meals which contain a substantial proportion of starch.

In my copending application Serial No. 711,403, filed February 15, 1934 and allowed February 23, 1937, entitled "Process of making soluble starch," I have set forth a method for producing a highly soluble starch which consists in treating the starch in two stages. This present invention differs in not only being a more economical method for producing a soluble starch, uniform in composition, but also in effecting the entire change from raw starch to soluble starch, in a single conversion, and also in that it points out a unique advantage obtainable by a combination of chemicals which brings about a more orderly and selective action of the converting agent as to not only prevent a too rapid action of the converting agent resulting in a loss of chemical, but also in a more orderly conversion action assuring a more uniform conversion of all the starch granules.

I am aware of a patent granted for a process of treating starch by adding highly concentrated oxidizing liquids, such as hypochlorite, to dry starch. The procedure described in this process consists in spraying a highly concentrated oxidizing chemical onto a mass of dry starch while it is being stirred by a powerful stirrer. This procedure has been tried and it has been found that it is quite impossible to produce a uniform product by this method probably because by spraying a very active converting chemical onto a mass of starch, some portions of the starch are saturated with the chemical and other portions receive no chemical. Continued stirring may bring about an exchange of moisture but it cannot bring about a uniform exchange and distribution of the chemical since the chemical by adsorption very promptly fixes itself to the immediate masses of starch with which it has contacted and cannot be distributed by any amount of mechanical mixing. The result, therefore, is that a large percentage of the granules are under-converted and another large portion are over-converted. An un-uniform product of this character has not found acceptance.

I am also aware of processes proposed for the dextrinization of starch or the dextrinization of cereal meals in which one or more chemicals, acidic in character, are sprayed onto starch or a starch-containing meal and by a subsequent heating or roasting process, the starch is converted into dextrine or dextrine and sugars. I am also aware of the proposed "Process for making soluble starch" consisting in treating dry starch with gaseous chlorine for a prolonged period of time, but the end products of these processes are of an entirely different type from the end product of this present invention which describes a process for producing a soluble starch, uniform in composition, by effecting the entire conversion into soluble starch by oxidation under such conditions as effect the uniform distribution of the chemical.

It will be apparent to those skilled in the art that the proportion of chemical or chemicals used may be varied and that other oxidizing chemicals may be substituted and other inhibiting or retarding agents may be employed without departing from the spirit of this invention, and I therefore do not limit myself to the particular chemicals or procedures described.

Having thus described my invention, what I desire to claim as new is:

1. That improvement in the method of producing an oxidized starch conversion product which consists in suspending a mixture of finely divided dry starchy material, an oxidizing agent and an oxidation retardant simultaneously and continuously in a gaseous medium in a sufficient quantity to effect the desired amount of conversion while maintaining the mixture in such a moist condition as to provide a moist powder, subjecting said mixture to a vigorous mechanical mixing action for a sufficient period of time while so suspended to substantially entirely coat the entire surfaces of substantially all of said starchy material with the oxidizing agent with which it is intimately intermingled, and subsequently separating the starch so treated from said medium and collecting the treated starch.

2. That improvement in the method of producing an oxidized starch conversion product which consists in suspending a mixture of finely divided dry starchy material, an oxidizing agent and an oxidation retardant simultaneously and continuously in a gaseous medium in a sufficient quantity to effect the desired amount of conversion while maintaining the mixture in such a moist condition as to provide a moist powder, subjecting said mixture to a vigorous mechanical mixing action for a sufficient period of time while so suspended to substantially entirely coat the entire surfaces of substantially all of said starchy material with the oxidizing agent with which it is intimately intermingled, confining said mixture in an enclosure during said mixing operation, discharging the mixture from said enclosure while it is still so suspended and directing said medium and the solids carried by it into different paths and thereby separating them and collecting the solids.

WALTER A. NIVLING.